United States Patent [19]

Schwille et al.

[11] 3,974,294

[45] Aug. 10, 1976

[54] PROCESS FOR THE PRODUCTION OF PROTEIN-CONTAINING FOOD ADDITIVES

[75] Inventors: Dieter Schwille, Heilbronn-Boeckingen; Hermann Seiz, Heilbronn; Ewald Sorg; Udo Sommer, both of Herrenberg-Oberjesingen, all of Germany

[73] Assignee: AGFA-Gevaert, A.G., Leverkusen, Germany

[22] Filed: Jan. 31, 1975

[21] Appl. No.: 545,886

[30] Foreign Application Priority Data

Feb. 6, 1974 Germany............................ 2405589

[52] U.S. Cl.................................... 426/32; 426/35; 426/41; 426/42; 426/44; 426/52; 426/63; 426/580; 426/583; 426/656; 426/657

[51] Int. Cl.². ........................................... A23J 3/00

[58] Field of Search ............... 426/7, 28, 32, 35, 41, 426/42, 63, 44, 52, 580, 583, 656, 657; 195/29

[56] References Cited

UNITED STATES PATENTS

| | | | |
|---|---|---|---|
| 2,338,415 | 1/1944 | Downey et al......................... | 426/32 |
| 2,364,008 | 11/1944 | Stuart ............................... | 426/32 X |
| 2,547,136 | 4/1951 | Oberg et al. .......................... | 426/42 |
| 2,585,225 | 2/1952 | Carlson.................................. | 426/42 |

*Primary Examiner*—A. Louis Monacell
*Assistant Examiner*—R. A. Yoncoskie
*Attorney, Agent, or Firm*—Connolly and Hutz

[57] ABSTRACT

Easily wettable, water-soluble protein products having a flocculation temperature of above 80°C and having no bitter taste can be prepared from natural protein sources by a hydrolytic, enzymatic treatment.

4 Claims, No Drawings

PROCESS FOR THE PRODUCTION OF PROTEIN-CONTAINING FOOD ADDITIVES

The invention relates to a process for the production of easily soluble and resorbable, protein-containing food additives from natural protein sources such as gelatin and whey.

For the production of high-quality foods or food additives which are rich in essential proteins, high-molecular proteins should be hydrolyzed to low molecular peptones so as to achieve easy and complete resorbability and improved wettability with water. The most varied protein substances are available as protein sources, for example gelatin, and also whey which is the liquid residue forming during the processing of milk.

The gelatin is easily split by all proteolytic enzymes. Gelatin solutions with a protein content of up to 40 % can be hydrolyzed over a period of 6 hours to such an extent that on cooling to 2°C gelling is no longer detectable. The gelatin molecule, which can be assumed to have a mean molecular weight of 60,000 to 80,000, is split into peptide fractions of 30 to 40 amino acid units. The wettability with water of these low molecular proteins (the so-called peptones) which are produced by said hydrolysis reaction is good: in addition, the enzymatic reaction does not cause the formation of compounds which impair taste. The only drawback to its use as a foodstuff is the low content of essential amino acids in the gelatin. In order to improve on the biological value of the gelatine the attempt was made to find new protein sources. Whey, that is the liquid residue forming in the processing of milk, constitutes such a suitable protein source. The whey protein essentially comprises lactoglobulin with a molecular weight of around 17,000. When such low molecular weight is involved the protein is digested and resorbed with sufficient rapidity. The wettability with water of the dry powder recovered from non-pretreated whey is extremely poor. Lumps form on stirring the dry powder into water. The resulting solution is not homogeneous. This disadvantage can be overcome by enzymatic pretreatment of the whey protein. Native protein molecules are split into low molecular fractions by highly active proteolytic enzymes in the enzymatic reaction. These low molecular fractions can no longer be flocculated by thermal treatment. However, since the proteolytic reaction results in compounds which are intensely bitter tasting, it is impossible to use whey treated in this manner in the food industry. Other natural and synthetic protein substances present similar, hitherto unsolved difficulties and problems.

It is among the objects of the present invention to find a process for the production of food additives containing proteins which are easily wettable and soluble in water and whose taste is perfectly acceptable.

According to the invention it has been found that water-soluble protein products which are easily wettable with water, can be produced by enzymatic treatment of natural proteins. In the process according to the invention these natural proteins are treated in an aqueous suspension with proteases of low activity at a temperature between 40°C and 60°C and a pH value between 7.5 and 10.

In accordance with the process of the invention reaction products are obtained which have no undesirable bitter taste. The products are easily wetted with water and dissolved in water. The thermal behaviour of the solutions is excellent and virtually no flocculation occurs upon heating.

Suitable proteases of low activity are in particular proteolytic enzymes from the group of pancreatic enzymes. In general these comprise non-specific enzyme mixtures which consist of proteases, for example aminopeptidase or carboxypeptidase, lipases and amylases. An enzyme mixture which has proved to be especially preferred comprises a mixture of enzymes from the fresh pancreas of the hog or ox and as such should convert 25 times its weight of starch into water-soluble products.

This mixture is sold under the name of pancreatin, for example by the firm of MERCK AG. The individual enzyme groups in the mixture have the following activity values:

3500 units per g protease
18000 units per g lipase
30000 units per g amylase

In principle, however, other proteolytic enzymes with suitable activity values may also be used. A person skilled in the art should have no difficulty in selecting a suitable proteolytic enzyme from the range of enzymes available. The following test which can be fitted into the run of routine work is decisive for the choice of enzyme.

If a proteolytic enzyme fulfills the requirements of this test it will easily qualify for use in the process according to the invention.

THE TEST TO ESTABLISH THE SUITABILITY OF PROTEINASES

A 20 % aqueous suspension of the protein substance to be treated is prepared. To this suspension there is added the enzyme to be tested in a weight ratio of 1 : 750, based on the dry weight of the protein to be treated. This mixture is heated for 3 to 4 hours to a temperature between 50°C and 60°C. The pH value is thereby kept at a value at which the enzyme under investigation is known to have optimum activity. In the case of the preferred pancreatic enzymes of low activity or the preferred enzymes of the trypsin group this pH value is in the range of between 7 and 8.5, preferably between 8 and 8.5. The optimal pH values for proteolytic activity are known from the relevant literature.

To qualify as suitable, the proteolytic enzymes must meet two conditions:
1. the enzymatically treated protein should be easily suspendable or soluble in water, that is flocculation should not occur upon heating to higher temperatures;
2. the enzymatically treated protein should not be bitter-tasting after treatment.

A proteolytic enzyme of low activity is suitable for the process in accordance with the invention if a protein suspension, after subjection to the above treatment, does not flocculate on heating to a temperature above 80°C and no bitter taste is detectable in a suitable test.

The following natural protein sources may be used in the process according to the invention: whey, milk (casein), soya protein or the protein concentrates or protein isolates prepared therefrom, maize protein, potato protein, wheat protein, oil-seed protein substances, nut kernel protein substances, sunflower kernal protein, egg proteins, or protein substances which can be obtained from grasses or mineral oils, e.g. by means of fermentation.

Even though the process according to the invention produces protein substances with sufficiently high flocculation temperatures and without any content of bitter substances, certain difficulties still exist due to the fact that the range of the reaction conditions under which the enzymatic decomposition proceeds so far that the flocculation temperature is sufficiently high, that is above 80°C, but not too high to give rise to the formation of low molecular, bitter-tasting substances, is relatively small. This requires very close adherence to the optimal reaction conditions, in particular in reactions involving larger amounts.

These disadvantages are obviated in a particularly preferred embodiment of the process according to the invention. Unexpectedly it has been found that if the enzymatic treatment of the proteins with proteolytic enzymes of low activity is carried out in the presence of gelatine or decomposition products of gelatin, then said process can be performed without difficulty and in an easily reproducible manner and will produce protein substances which meet the above conditions and are excellently suitable as food additives. Unexpectedly the gelatin or gelatin decomposition products would appear to influence the proteolytic action of the enzymes so that the resulting protein products are split into lower molecular protein products which have the required properties as regards flocculation temperature and bitter substance content.

As already mentioned both customary gelatins and gelatin decomposition products can be added to the solutions of the initial protein products, which are to undergo treatment, prior to the enzymatic reaction.

The concentration of the gelatins in the reaction mixture can vary over a wide range. It will depend partly on the nature of the protein substances to be treated and, of course on the desired properties of the final product. Mixtures of protein substances and gelatins in a weight ratio of 10 : 1 and 1 : 10 have proved suitable.

The concentration of the gelatin to be added will of course not only depend on how the process is performed, but on the desired properties of the final product with regard to its biological valency. When using whey, for example, as the natural protein source, a mixture of whey and gelatin in a weight ratio of about 1 : 1 has an optimal biological valency with an optimal content of all essential amino acids.

This preferred embodiment also has the advantage over prior art processes, wherein the proteins are subjected to enzymatic reaction and sprayed in the presence of gelatin in the spray-drying process, that the protein solution produced by the process of the invention can be more easily managed in the subsequent spray-drying process since the solutions do not contain the natural, light and voluminous gelatin powder but the above defined reaction mixture.

The protein products obtained according to the process of the invention have excellent food-technological properties. They show excellent wettability and very good solubility in water. Almost clear, aqueous solutions without residues are obtained which are miscible with water or other water-containing preparations in practically unlimited ratios. Even if the solution is left to stand for hours, or heated to temperatures over 80°C still no signs of flocculation are detectable. The products have an almost neutral taste and are hence eminently suitable for use as additives in all types of foods, e.g. in the preparation of fruit or juice concentrates.

It is of particular importance that even concentrated aqueous solutions, which contain the protein substances in concentrations of up to about 50 %, can be heated for hours without flocculation occurring to temperatures suitable for effecting sterilisation. In this way protein products are obtained whose germ content is so low as to easily meet the standard demanded of babyfoods. Sterilisation, pasteurisation or other preserving or food-technological measures can be carried out without running to risk of harming or denaturating the products.

The fact that these products which are obtained in accordance with the process of the invention and which are of great importance in the field of human nutrition are sterilisable vastly increases their range of use. They can be used for example as additives in baby-foods, dietetic foods and even in drugs. They are also suitable as carriers or fillers in high-quality foods and drugs. As a result it will be possible to replace the carbohydrates which are normally used as carriers and fillers by the protein products of the highest biological valency obtained in accordance with the process of the invention.

If intended for dietetic and medical application it is frequently a physiological necessity that a special amino acid composition is available (biological valency, PER value etc.). The protein products produced in accordance with the process of the invention are eminently suitable for the solution of such problems, as they contain the protein components from various sources in a readily miscible form without the different components influencing each other in an undesirable manner.

The protein products obtained according to the process of the invention can be pressed together with carbohydrates and other vegetable fillers, e.g. with the aid of an extruder, into bars which retain their shape. In contrast to conventional protein substances, high molecular products do not form and hence the protein product of the invention can be pressed together with other natural products into bars without clogging i.e. gelatinization, agglutination or glutinization. It is furthermore of particular importance that undesired accompanying substances which are arrested by conventional protein substances as a result of their activity as colloidal protectors can be removed by physical processes (adsorption, eluation) from the protein products obtained in accordance with the process of the invention. This possibility is for example of great importance for the removal of benzopyrene from protein substances which are obtained from crude oils. In this way hitherto unsuitable protein substances can be made fit for human and animal consumption.

EXAMPLE 1

A 20 % aqueous solution of whey protein is heated to 45°C and adjusted with sodium hydroxide solution to a pH value of 8.5. At this temperature there is added whilst vigorously stirring a mixture of the enzymes proteinase, lipase and amylase, for example the product sold under the name of pancreatin by the firm of MERCK AG in a weight ratio of 1 : 1000 (based on the whey protein contained in the solution). Stirring is carried out for 4 hours at a pH value of 8.5 and a temperature of 45°C and a further amount of pancreatin (weight ratio 1 : 2000) added. Thereafter the temperature is slowly increased to 60°C. The solution then becomes viscous, but the whey protein does not flocculate. After a further 2 to 3 hours the protein is hydrolyzed to such an extent that the protein solution can be pasteurised in the sterilizer without flocculation occurring.

The protein solution of Example 2 is dried in the usual way by spraying. Analysis revealed the products thereafter obtained to have the following composition:

| Decomposition products of | gelatin % | whey | gelatin + whey (1 : 1) % |
|---|---|---|---|
| Weight loss on drying | 5,9 | 5,3 | 4,5 |
| Carbohydrates | — | 4,4 | 3,9 |
| Ash | 5,7 | 7,4 | 5,4 |
| N-Content | 14,1 | 13,2 | 13,7 |
| N-Substance (Natural protein N.6,25) | 88,1 | 82,5 | 85,6 |

100 g Natural protein contained in %:

| Decomposition products of | gelatin | whey | gelatin + whey (1 : 1) |
|---|---|---|---|
| Lysine | 4,55 | 8,82 | 5,92 |
| Histidine | 1,78 | 2,89 | 1,66 |
| Arginine | 5,21 | 3,38 | 6,88 |
| Tryptophane | 2,42 | + | 1,33 |
| Aspartic acid | 6,82 | 7,88 | 7,17 |
| Threonine | 1,96 | 4,66 | 2,77 |
| Serine | 3,77 | 5,23 | 4,23 |
| Glutamic acid | 8,43 | 11,32 | 14,54 |
| Proline | 15,20 | 10,13 | 12,51 |
| Glycine | 6,03 | 1,85 | 10,46 |
| Alanine | 5,12 | 3,58 | 7,17 |
| Cysteine | 1,35 | 1,61 | 0,82 |
| Valine | 2,53 | 6,09 | 4,04 |
| Methionine | 0,81 | 3,12 | 1,57 |
| Isoleucine | 1,46 | 5,38 | 2,83 |
| Leucine | 3,14 | 10,13 | 5,47 |
| Tyrosine | + | 4,97 | 1,89 |
| Phenylalanine | 1,93 | 5,22 | 3,25 |
| Glycocoll | 24,97 | 3,84 | 4,44 |

EXAMPLE 2

A 20 % gelatin is mixed at 45°C with a 20 % solution of whey protein in a ratio of 1 : 1. By means of sodium hydroxide solution a pH value of 8.5 is adjusted. Pancreatin is added, whilst thoroughly stirring, at 45°C in a weight ratio of 1 : 1000 (based on the dry protein substance contained in the solution). Stirring is continued at a pH value of 8.5 and a temperature of 45°C until a distinct decrease in viscosity is no longer detectable. Additional pancreatin (1 : 2000) is then added and the temperature slowly increased to 60°C. After a further 2 to 3 hours the protein is so far hydrolyzed that the solution can be pasteurised in the sterilizer at 70°C without flocculation occurring.

We claim:

1. In a process for the preparation of easily wettable water-soluble products of natural proteins which have no bitter taste by enzymatic degradation of natural proteins, the improvement according to which protein selected from the group of protein sources consisting of whey, milk, soya, maize, potatoes, wheat, oilseed, nut kernal, sunflower kernal or egg is subjected to hydrolysis in an aqueous suspension in the presence of gelatin, the mixture of said protein and gelatin being in a weight ratio of 10:1 to 1:10 and which said hydrolysis is accomplished by proteolytic enzymes of low activity from the group of pancreatic enzymes at a temperature between 40 and 60° and an optimum pH value for the activity of the proteolytic enzyme and wherein said water soluble product has a flocculation temperature above 80°C.

2. The process according to claim 1, characterized in that hydrolysis takes place at a pH value of between 7.5 and 10.

3. The process according to claim 1, characterized in that proteolytic enzymes from the trypsin group are used.

4. The process according to claim 3, characterized in that mixtures of pancreatic enzymes, which contain proteinase, lipase and amylase are used.

* * * * *